(12) United States Patent
Shukla et al.

(10) Patent No.: US 11,506,508 B2
(45) Date of Patent: Nov. 22, 2022

(54) SYSTEM AND METHOD USING DEEP LEARNING MACHINE VISION TO ANALYZE LOCALITIES

(71) Applicant: Dell Products L.P., Round Rock, TX (US)

(72) Inventors: Ravi Shukla, Bangalore (IN); Sumant Sahoo, Bangalore (IN); Prakash Sridharan, Bangalore (IN); Ramakanth Kanagovi, Bangalore (IN); Arun Swamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 380 days.

(21) Appl. No.: 16/729,414

(22) Filed: Dec. 29, 2019

(65) Prior Publication Data

US 2021/0199457 A1 Jul. 1, 2021

(51) Int. Cl.
*G01C 21/36* (2006.01)
*G06F 16/28* (2019.01)
(Continued)

(52) U.S. Cl.
CPC ....... *G01C 21/3602* (2013.01); *G01C 21/367* (2013.01); *G01C 21/3679* (2013.01);
(Continued)

(58) Field of Classification Search
CPC .............. G01C 21/3602; G01C 21/367; G01C 21/3679; G06F 16/288; G06F 16/29; G06K 9/6267
See application file for complete search history.

(56) References Cited

U.S. PATENT DOCUMENTS 10,621,203 B2 4/2020 Hunt et al.
2006/0074707 A1 4/2006 Schuette et al.
(Continued)

OTHER PUBLICATIONS

Benjamin Letham et al., Sequential event prediction, Machine Learning 93:357-380, 2013 http://lethalletham.com/Letham_SEP_final.pdf.
(Continued)

*Primary Examiner* — Rami Khatib
*Assistant Examiner* — Gabriel J Lambert
(74) *Attorney, Agent, or Firm* — Terrile, Cannatti & Chambers; Stephen A. Terrile

(57) ABSTRACT

A system, method, and computer-readable storage medium are disclosed that execute machine vision operations to categorize a locality. At least one embodiment accesses a map image of a locality, where the map image includes geographical artefacts corresponding to entities within the locality; analyzes the map image to detect the entities in the locality using the geographical artefacts; assigns entity classes to detected entities in the locality; assigns a locality score to the locality based on entity classes included in the locality; retrieves street view images for one or more of the detected entities in the locality; and analyzes street view images of the detected entities to assign one or more further classifications to the detected entities. Other embodiments include corresponding computer systems, apparatus, and computer programs recorded on one or more computer storage devices, each configured to perform the actions of the method.

20 Claims, 10 Drawing Sheets

(51) Int. Cl.
*G06F 16/29* (2019.01)
*G06K 9/62* (2022.01)
*G06N 3/08* (2006.01)

(52) U.S. Cl.
CPC ............ *G06F 16/288* (2019.01); *G06F 16/29* (2019.01); *G06K 9/6267* (2013.01); *G06N 3/08* (2013.01)

(56) References Cited

U.S. PATENT DOCUMENTS

| | | |
|---|---|---|
| 2009/0006151 A1 | 1/2009 | Zarghami et al. |
| 2013/0028508 A1* | 1/2013 | Perronnin ............ G06V 30/422 |
| | | 382/159 |
| 2014/0156347 A1 | 6/2014 | Agrawal et al. |
| 2015/0348094 A1 | 12/2015 | Ferber et al. |
| 2017/0052967 A1* | 2/2017 | Castillo ................ G06F 16/248 |
| 2017/0109615 A1* | 4/2017 | Yatziv .................. G06K 9/6282 |
| 2017/0278289 A1* | 9/2017 | Marino .................. G06T 11/60 |
| 2018/0082237 A1 | 3/2018 | Nagel et al. |
| 2018/0137551 A1* | 5/2018 | Zheng .................... G06V 10/42 |
| 2018/0181807 A1* | 6/2018 | Yankov ................ G06V 30/194 |
| 2019/0012683 A1 | 1/2019 | Jang et al. |
| 2020/0058042 A1* | 2/2020 | Kulkarni ............... G06N 20/00 |
| 2020/0380540 A1 | 12/2020 | Fox et al. |

OTHER PUBLICATIONS

Yanpeng Zhao et al., Sequence Prediction Using Neural Network Classifiers, JMLR: Workshop and Conference Proceedings 57:164,169, The Sequence Predictlction ChallengE (SPiCe), 2016 http://proceedings.mlr.press/v57/zhao16.pdf.

* cited by examiner

SYSTEM AND METHOD USING DEEP LEARNING MACHINE VISION TO ANALYZE LOCALITIES

BACKGROUND OF THE INVENTION

Field of the Disclosure

The present disclosure relates to information handling systems. More specifically, embodiments of the disclosure relate to a system and method using deep learning machine vision to categorize localities.

Description of the Related Art

As the value and use of information continues to increase, individuals and businesses seek additional ways to process and store information. Options available to users include information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as customer record management, business projection analysis, etc. In addition, information handling systems may include a variety of hardware and software components that are configured to process, store, and communicate information and may include one or more computer systems, data storage systems, and networking systems.

SUMMARY

A system of one or more computers can be configured to perform particular operations or actions by virtue of having software, firmware, hardware, or a combination of them installed on the system that in operation causes the system to execute machine vision operations to categorize a locality. At least one embodiment includes a computer-implemented method including: accessing a map image of a locality, where the map image includes geographical artefacts corresponding to entities within the locality; analyzing the map image to detect the entities in the locality using the geographical artefacts; assigning entity classes to detected entities in the locality; assigning a locality score to the locality based on entity classes included in the locality; retrieving street view images for one or more of the detected entities in the locality; and analyzing street view images of the detected entities to assign one or more further classifications to the detected entities. Other embodiments of this aspect include corresponding computer systems, apparatus, and computer programs recorded on one or more computer storage devices, each configured to perform the actions of the methods.

At least one embodiment includes a system having a processor; a data bus coupled to the processor; and a non-transitory, computer-readable storage medium embodying computer program code, the non-transitory, computer-readable storage medium being coupled to the data bus, the computer program code interacting with a plurality of computer operations and may include instructions executable by the processor and configured for: accessing a map image of a locality, where the map image includes geographical artefacts corresponding to entities within the locality; analyzing the map image to detect the entities in the locality using the geographical artefacts; assigning entity classes to detected entities in the locality; assigning a locality score to the locality based on entity classes included in the locality; retrieving street view images for one or more of the detected entities in the locality; and analyzing street view images of the detected entities to assign one or more further classifications to the detected entities.

At least one embodiment includes a non-transitory, computer-readable storage medium embodying computer program code, the computer program code may include computer-executable instructions configured for: accessing a map image of a locality, where the map image includes geographical artefacts corresponding to entities within the locality; analyzing the map image to detect the entities in the locality using the geographical artefacts; assigning entity classes to detected entities in the locality; assigning a locality score to the locality based on entity classes included in the locality; retrieving street view images for one or more of the detected entities in the locality; and analyzing street view images of the detected entities to assign one or more further classifications to the detected entities.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

Systems and methods are disclosed for employing deep learning machine vision analysis on geographic artefacts found in map images for various localities in order to collect and interpret customer ecosystem data that translates into meaningful and actionable insights that may be used by an enterprise to increase account retention, induce account spending, identify whitespace accounts, mine leads, and position products for existing greenfield accounts. In certain embodiments, the neural networks are used to identify geographic artifacts (e.g., Text/Icons/Visual Cues) present in a map for a locality. In certain embodiments, the geographic artifacts correspond to entities existing within a boundary of the locality. In certain embodiments, the entities may be assigned different entity types to determine a locality score based on the types of entities in the locality. In certain embodiments, street view images associated with the entities within the locality are accessed and provided to a deep learning network to obtain further insights for the entity and/or locality. For purposes of the present disclosure, a street view image of an entity includes any image from which an external view of the building or area associated with the entity may be extracted.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
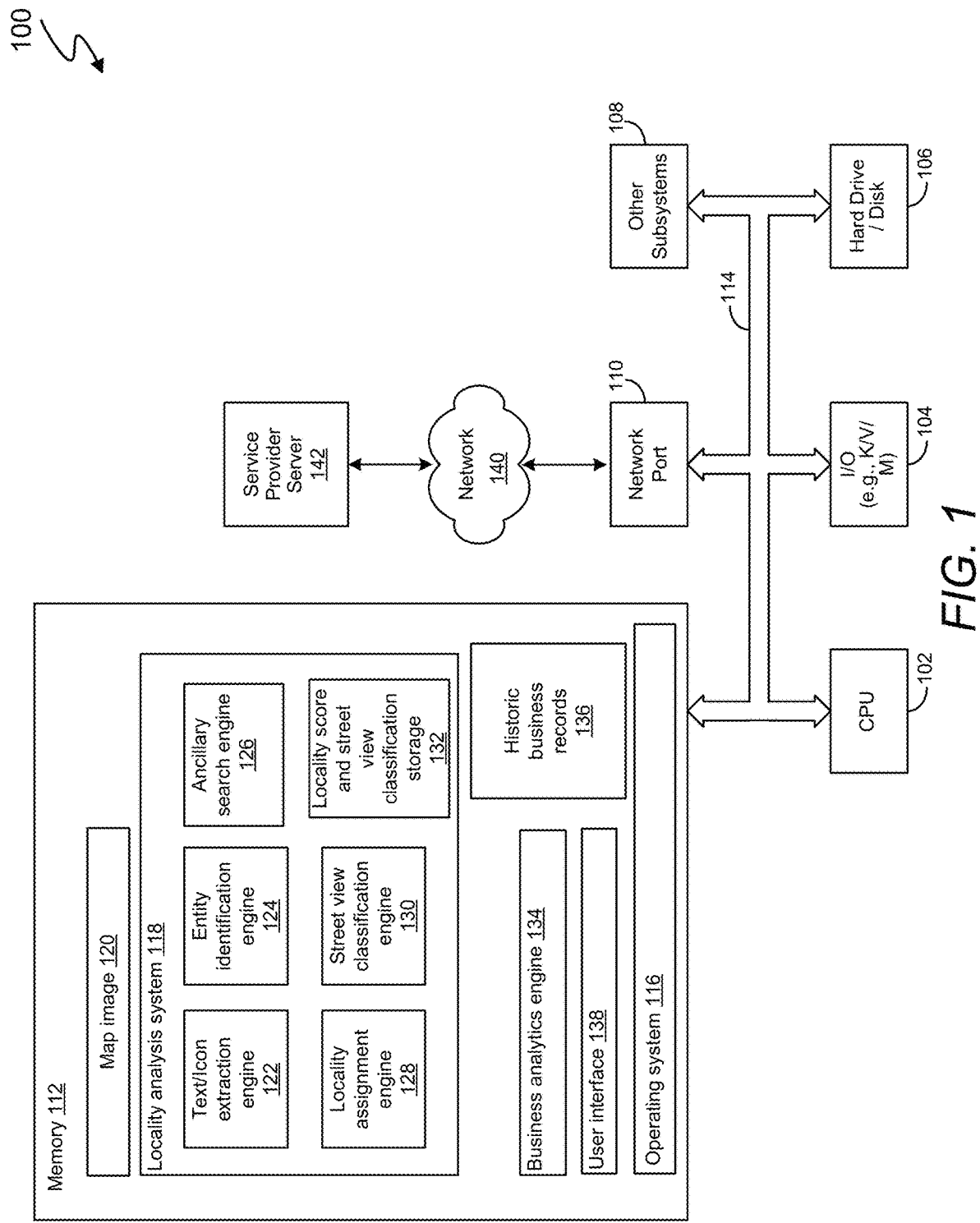
FIG. 1 is a generalized illustration of an information handling system that is configured to implement certain embodiments of the system and method of the present disclosure.

FIG. 1 is a generalized illustration of an information handling system 100 that is configured to implement certain embodiments of the system and method of the present disclosure. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is accessible by a service provider server 142. In certain embodiments, a user interacts with the various components and engines of the information handling system 100 through a user interface 138.

The information handling system 100 likewise includes system memory 112, which is interconnected to the foregoing via one or more buses 114. System memory 112 may be local memory, remote memory, memory distributed between multiple information handling systems, etc. System memory 112 further comprises an operating system 116 and in various embodiments may also comprise other software modules and engines configured to implement certain embodiments of the disclosed system.

In the example shown in FIG. 1, memory 112 includes a locality analysis system 118 that is configured to generate a locality score for a locality defined by a map image 120 and, in some embodiments, add further classifications to entities in the locality based on images of the buildings or areas associated with the entities may be extracted. The boundaries defining the locality of map image 120 may be entered directly by a user. Additionally, or in the alternative, the boundaries used to define various localities may be based on business sector, business region, product sector, etc. In certain embodiments, the map image 120 may include boundaries for multiple, separate localities that are analyzed as different localities by the locality analysis system 118. In certain embodiments, the map image 120 may be limited to a map image of a single locality that is to be analyzed by the locality analysis system 118.

The exemplary locality analysis system 118 shown in FIG. 1 includes a text/icon extraction engine 122. In at least one embodiment, the text/icon extraction engine 122 includes a convolutional neural network (CNN) that consumes segmented pixel areas (e.g., 15 by 15 pixel areas) of the map image 120 and distinguishes areas containing text and/or icons from areas that do not contain text and/or icons. In at least one embodiment, the text and/or icon pixel areas are used to reconstruct a map image that generally includes only the text and/or icon pixel areas. The same CNN or another CNN of the text/icon extraction engine 122 performs an optical character recognition (OCR) operation on the reconstructed map image. In certain embodiments, the OCR text is provided to an entity identification engine 124, which assists in identifying the type of entity associated with the OCR text. In certain embodiments, the type of entity may be directly derived from the text associated with the entity. As an example, an entity described as "Phoenix Movie Theater" in the OCR text may be properly determined to be a movie theater type entity. In certain embodiments, the type of entity may be derived from an icon associated with the text of the entity. As an example, an entity described as "Phoenix" in the OCR text and having a movie theater icon in close proximity to the text may be properly classified as a movie theater type entity.

In at least one embodiment, OCR text is used to search ancillary sources to identify the entities within the locality. To this end, certain embodiments may include an ancillary search engine 126 that is configured to search external ancillary sources of information associated with the locality using the OCR text to identify the type of entity associated with the OCR text. In some embodiments, the ancillary search engine 126 may include a web browser configured to access ancillary sources such as yellow pages for the locality, tourist guides for the locality, etc. As an example, the OCR text "Phoenix," without more, makes identification of the type of entity that is to be assigned to "Phoenix" difficult. However, in at least one embodiment, the ancillary search engine 126 may search the ancillary sources using the text "Phoenix" and find that there is a movie theater by the name of "Phoenix" in the locality. As such, the entity "Phoenix" is classified as a movie theater type entity. Based on the teachings of the present disclosure, it will be recognized that the foregoing entity type assignment operations may be extended to multiple entity types such as, without limitation, hotels, restaurants, schools, retailers, service operators, etc.

In certain embodiments, the locality is assigned a locality score by locality assignment engine 128. At least one embodiment, entities of similar entity types are clustered by the locality assignment engine 128. As an example, text such as "school," "college," "University," etc. may be aggregated with one another in an "education" cluster. As another example, theater entities may be aggregated with one another in a "theater" cluster. In certain embodiments, the text used to identify particular entity types may be clustered using a clustering algorithm like, for example, K-means.

In certain embodiments, the locality score corresponds to the percentage that an entity type contributes to the overall entity makeup of the locality. As an example, let x1, x2, x3 . . . xn be the percentage of entities in a text cluster that represents the entire body of entities in the locality. For example, if a locality has 30% schools and 40% theaters, then the locality will have a score of x1=30% school and x2=40% theater. However, in certain embodiments, the entity type xi is only used in the locality score if xi is greater than a predetermined threshold (e.g. xi>10%). If all xi are less than 10% the locality may be considered as a mixed locality. In such embodiments, locality scores may be assigned to the locality using a percentage based analysis, where a percentage is assigned to each cluster type based on a number of entities included in the cluster type to a total number of clustered entities.

In at least one embodiment, pictorial images, such as street view images, of the identified entities and/or areas proximate to the identified entities may be retrieved from one or more online sources. In at least one embodiment, the street view images are provided to a CNN of a street view classification engine 130 and used to further classify the entities within the locality. In at least one embodiment, a CNN trained on a given entity type is used to assign further classifications to an entity of the given entity type based on the street view image of the entity and/or street view images of areas proximate the entity. For example, the street view image of a school in the locality may be provided to a CNN trained on school images from multiple training sources. The CNN may use the street view image of the school to classify the school based on its size (e.g., large, medium, small), based on visual features of the school indicative of income demographics (e.g., high-income, middle-income, low-income), etc. in certain embodiments, the locality score and street view classification for the locality and entities within the locality are proper provided to score/classification storage 132. In various embodiments, without limitation, the data in the score/classification storage 132 may be retained directly in local memory, offloaded to external storage, etc.

Certain embodiments of the information handling system 100 include a business analytics engine 134. In at least one embodiment, the business analytics engine correlates locality scores and street view classifications to accounts existing in historical business records 136 so that the locality scores and/or street view classifications may be used by the business analytics engine 134 in product projections, targeting of marketing campaigns, lead generation, etc.

Figure 2:
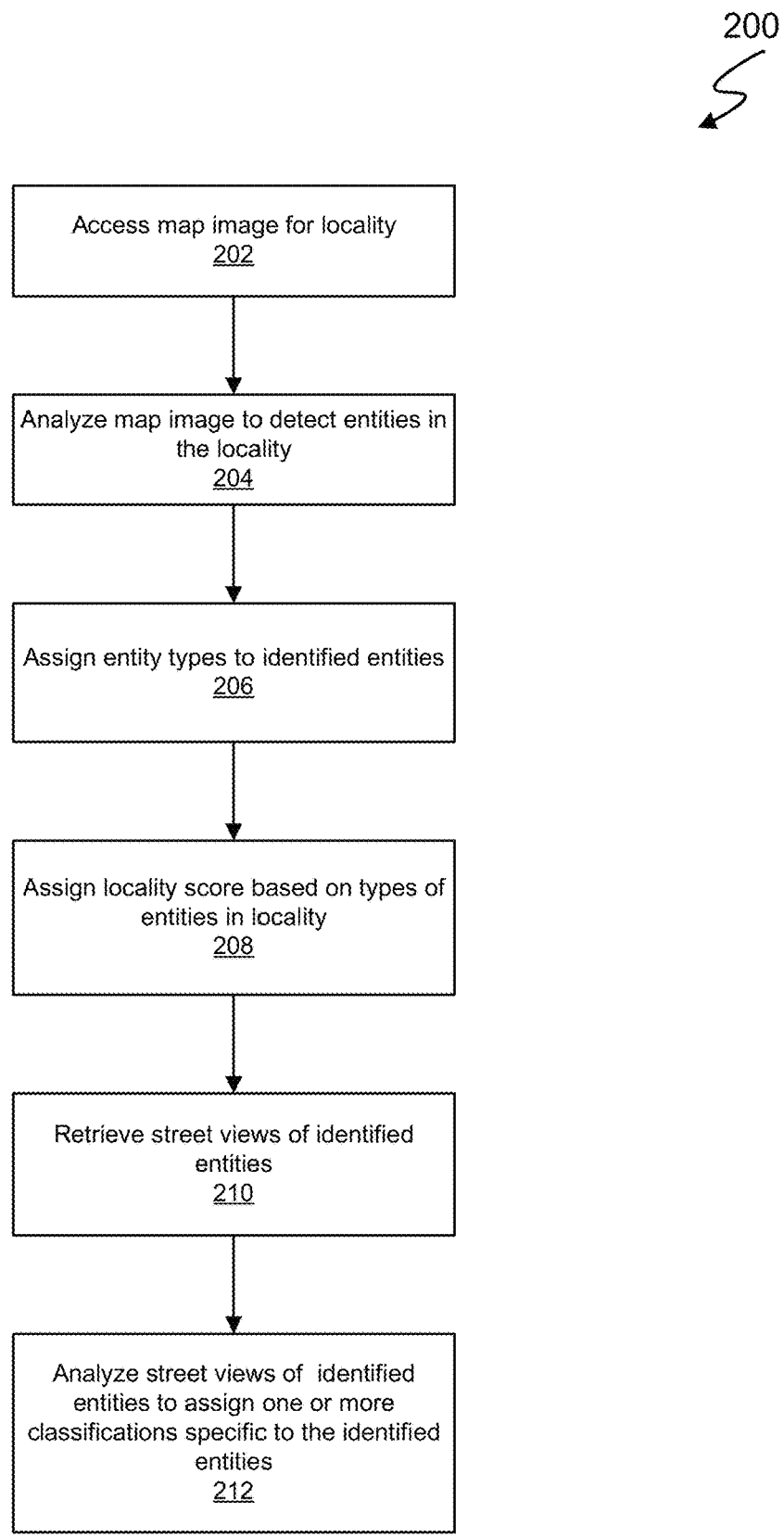
FIG. 2 is a flowchart depicting exemplary operations that may be executed in certain embodiments of the disclosed system.

FIG. 2 is a flowchart 200 depicting exemplary operations that may be executed in certain embodiments of the disclosed system. In this example, a map image for a locality that is to be analyzed is accessed at operation 202. At operation 204, the map image is analyzed to detect entities in the locality. Entity types are assigned to the detected entities at operation 206, and a locality score is assigned to the locality at operation 208 based on the types of entities in the locality. In certain embodiments, street views of the detected entities are retrieved at operation 210 and analyzed at operation 212 to assign further classifications to the entities based on the entity images and/or images of areas proximate the entity.

Figure 3:
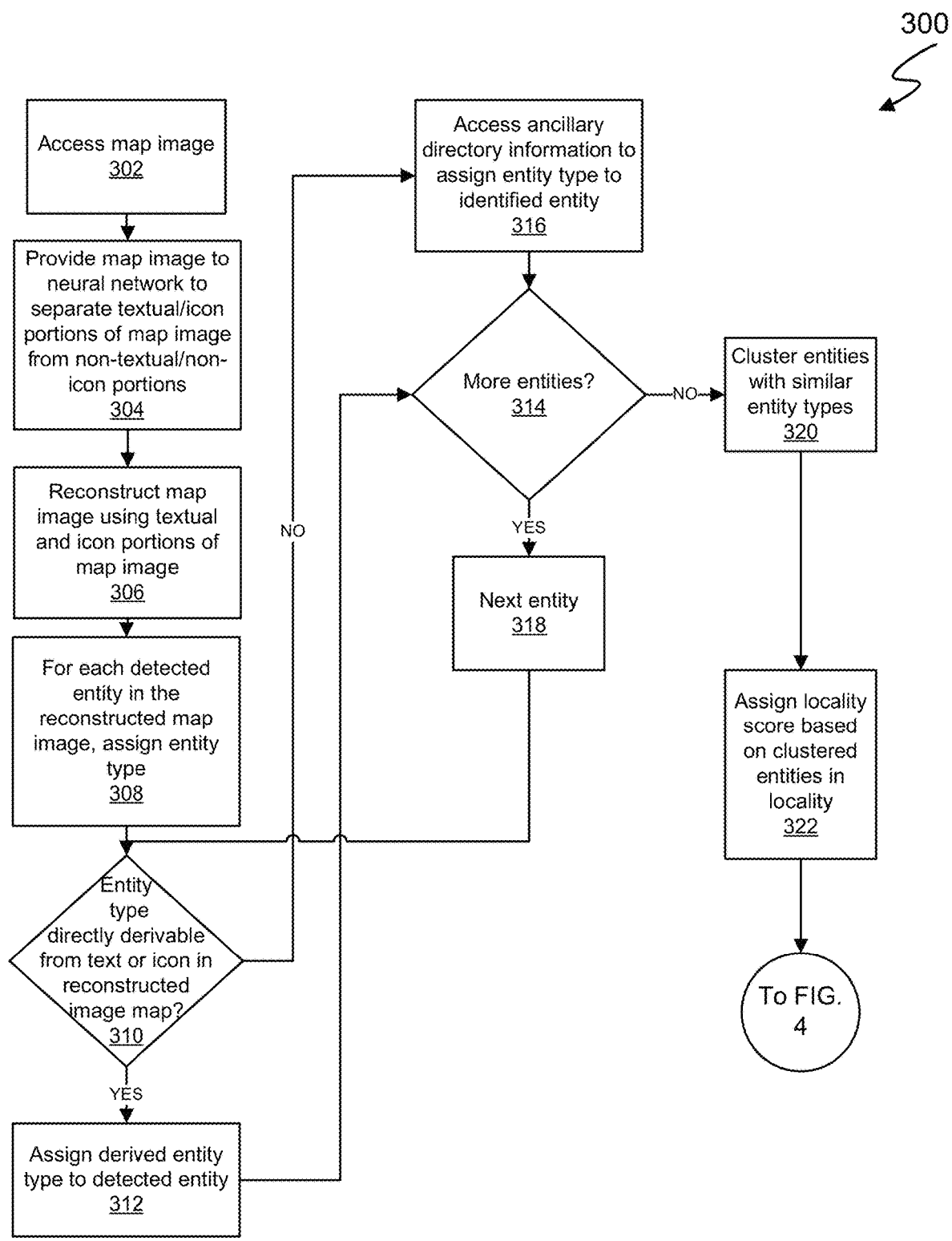
FIG. 3 is a flowchart depicting exemplary operations that may be executed in certain embodiments of the disclosed system.
Figure 4:
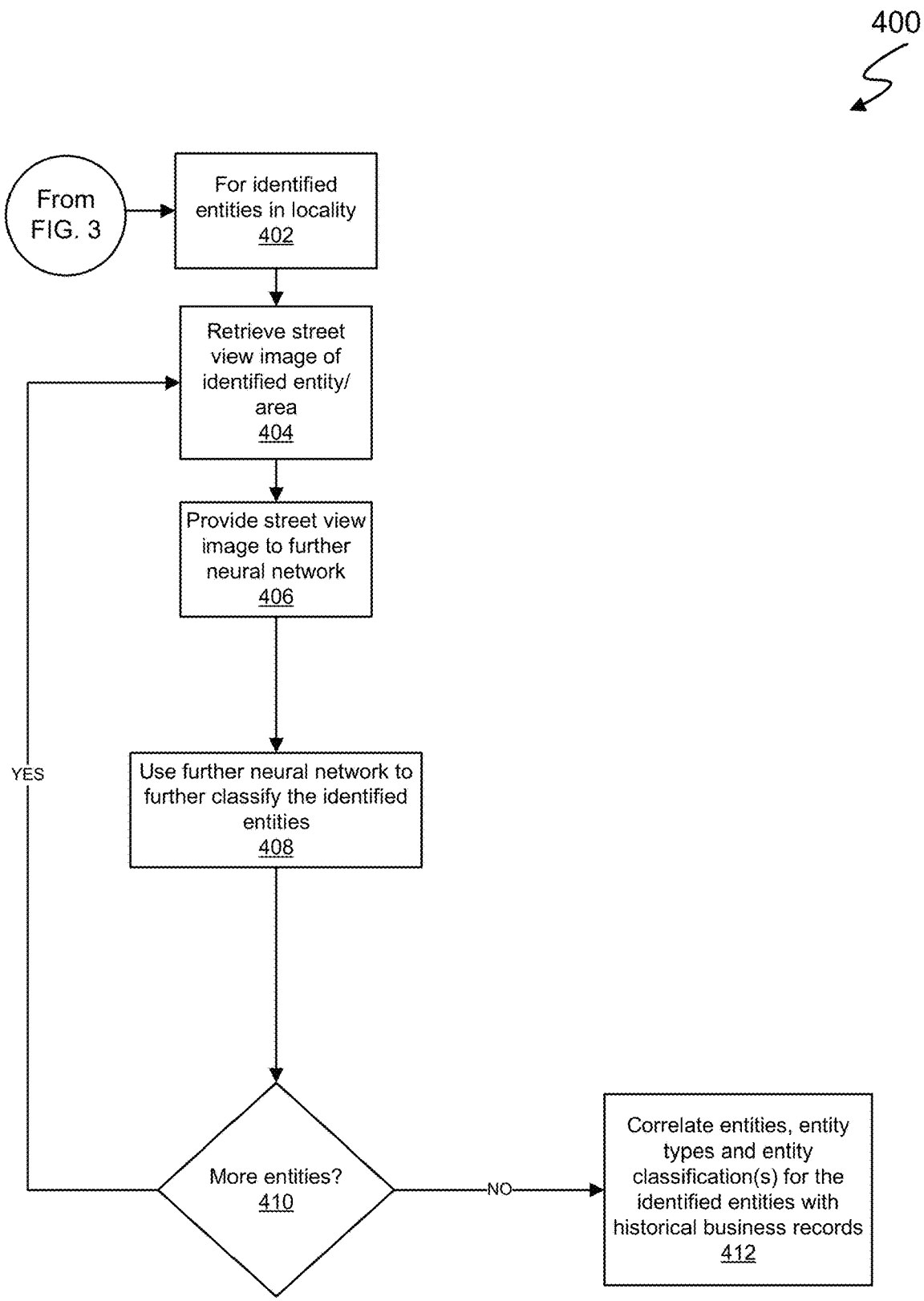
FIG. 4 is a flowchart depicting exemplary operations that may be executed in certain embodiments of the disclosed system.

FIG. 3 is a flowchart 300 and FIG. 4 is a flowchart 400 depicting exemplary operations that may be executed in certain embodiments of the disclosed system. With reference to flowchart 300, a map image for the locality that is to be analyzed is accessed at operation 302. At least one embodiment, the map image is provided to a CNN at operation 304 to separate textual/icon portions of the map image from non-textual/non-icon portions of the map image. In at least one embodiment, the CNN reconstructs the map image at operation 306 using the textual and/or icon portions of the map image.

Beginning at operation 308, detected entities in the reconstructed map image are assigned an entity type (e.g., school, theater, retailer, service center, office complex, etc.). To this end, certain embodiments determine at operation 310 whether the entity type is directly derivable from the text associated with the entity or an icon proximate the text for the entity in the reconstructed map image. If the entity type is directly derivable, the entity is assigned the derived entity type at operation 312, and a check is made at operation 314 as to whether or not there are more entities for which an entity type is to be assigned.

If the entity type cannot be directly derived from the text and/or icon information for the entity at operation 310, ancillary directory information may be accessed for the entity at operation 316. In one example, text associated with the detected entity is extracted using, for example, an OCR technique. The OCR text (e.g., "Phoenix") is then used to search the ancillary directory information to provide a more specific name or description of the entity (e.g., "Phoenix Multiplex Theater"). Using the ancillary directory information, the detected entity "Phoenix" in this example is assigned an entity type of "theater" or "multiplex theater."

After an entity has been assigned an entity type at either operation 312 or operation 316, a check is made at operation 314 to determine whether there are more detected entities that are in need of an entity type assignment. If so, the entity type assignment operations are executed with the next entity starting at operation 318.

Embodiments of the disclosed system assign locality scores to a locality based on the types of entities found in the locality. In one example, all entities with similar entity types are clustered at operation 320. As an example, entities having an entity type of "school," "University," "college," etc. may be clustered as "education" entities. As a further example, entities having an entity type of "cinema," "movie," "movie house," etc., may be clustered as "movie theater" entities. As a further example, entities having an entity type of "boarding-house," "court," "lodging," etc., may be clustered as "hotel" entities. At operation 322, a locality score is assigned to the locality based on the clustered entities. In at least one embodiment, the locality score corresponds to the percentage that an entity type contributes to the overall entity makeup of the locality.

FIG. 4 is a flowchart 400 of additional operations that may be executed in certain embodiments of the disclosed system to provide further classifications for the identified entities. In this example, for each of the entities identified in the locality at operation 402, a street view image of the identified entity and/or area proximate the entities retrieved at operation 404. Street view images for an entity may be obtained in a number of different manners from different sources. In at least one embodiment, the text identifying the entity is used to generate a query that is used to retrieve images from, for example, as Google's Street View database. In certain embodiments, the text identifying the entity may be used to generate an Internet search to access the website of the entity having entity images. Based on the teachings of the present disclosure, other means of accessing entity images from public and/or private data stores may be employed.

In certain embodiments, the street view image retrieved at operation 404 is provided to the input of a CNN at operation 406. At operation 408, certain embodiments of the CNN further classify the identified entities using the corresponding street view images. In one example, the CNN may assign further classifications to a school entity based on the appearance of the entity in the school image. Certain characteristics of the image may be used to classify the size of the school, the likely income demographics of the school, whether the school facility is likely to have a sports program, etc. In another example, the CNN may classify a hotel entity based on, for example, the size of the hotel entity, the likely income demographic of the hotel entity, whether the hotel entity is a luxury hotel, etc. In at least one embodiment, the image for the entity is presented to a CNN that has been trained on the same type of entity. As an example, the image of a school entity will be provided to a CNN that has been trained to classify school entities. Similarly, the image of a hotel entity will be provided to a CNN has been trained to classify hotel entities. As will be recognized from the teachings of the present disclosure, the classifications provided by the CNN are the subject of design choice and may be selected to represent further entity classifications that are useful for various tactical and strategic business goals.

Once a further classification, if any, is assigned to an entity at operation 408, a check is made at operation 410 to determine whether any more entities are to be further classified using the street view image of the entity. If more entities are to be subject to further classification, certain embodiments continue to implement operations 404, 406, and 408 until such here are no more entities that are subject to further classification. Entities that have been assigned an entity type and classified within the locality may be correlated with historical records at operation 412 for use in subsequent business analytics applications.

Figure 5:
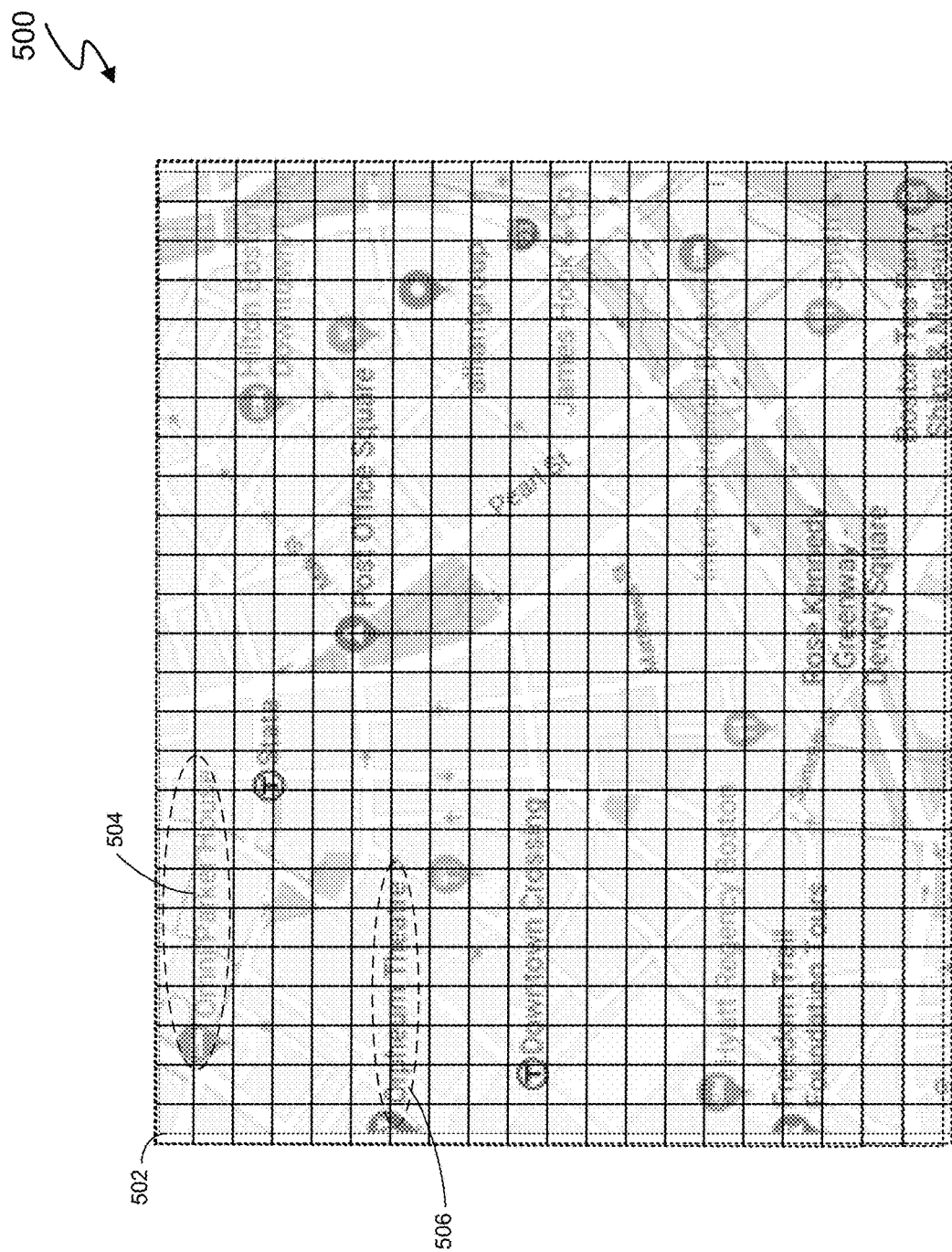
FIG. 5 shows an exemplary map image of a locality that may be analyzed using certain embodiments of the disclosed system.

FIG. 5 shows an exemplary map image 500 of a locality that may be analyzed using certain embodiments of the disclosed system. The specific example shown in FIG. 5 is a map image of an area of downtown Boston, Mass. Map image 500 includes regions of segmented pixel areas 502 that form text images and icon images. In this example, the map image 500 includes a region 504 of segmented pixel areas 502 containing an image representing the text "Omni Parker House." Another portion of the map image 500 includes a region 506 of segmented pixel areas 502 containing an image representing the text "Orpheum Theater." Other regions of the map image include segmented pixel areas corresponding to images of other text and/or icons.

Figure 6:
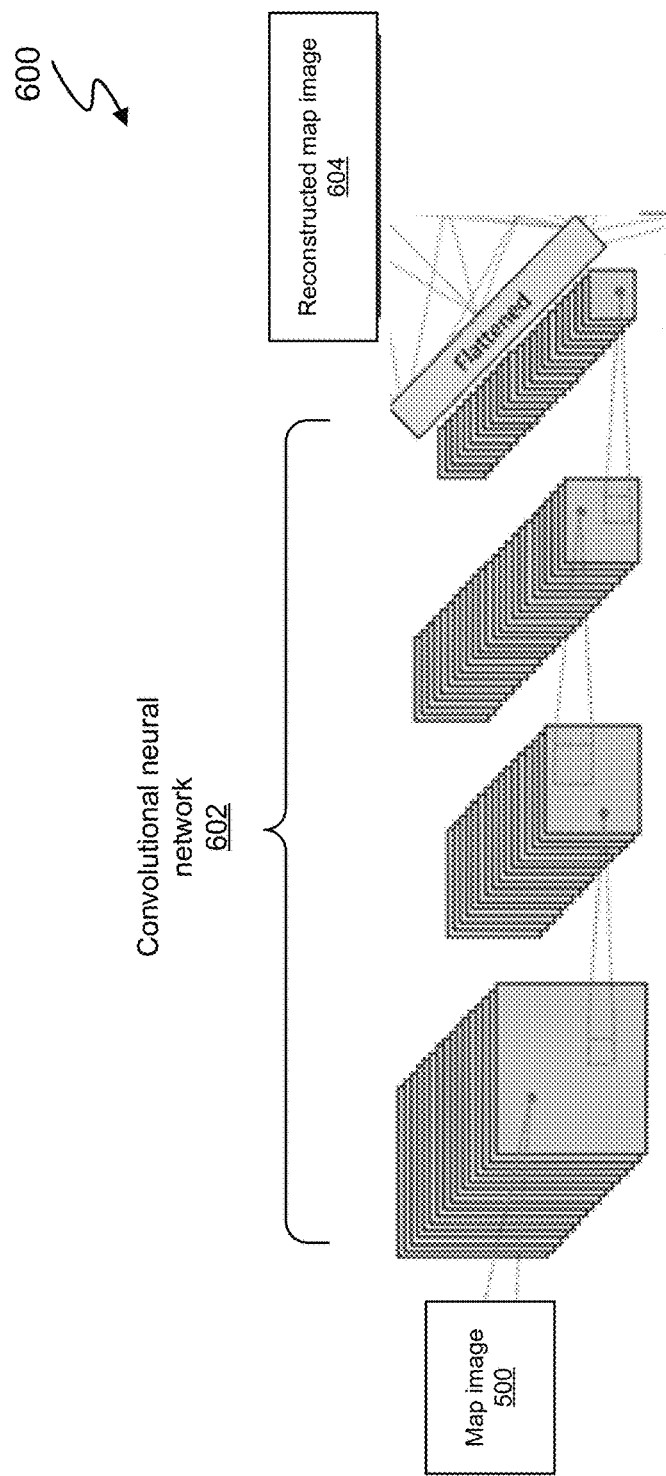
FIG. 6 shows a neural network environment that may be used in certain embodiments of the disclosed system.

FIG. 6 shows a neural network environment 600 that may be used in certain embodiments of the disclosed system. In this example, the map image 500 is provided to the input of a convolutional neural network 602. The convolutional neural network 602 is trained to extract regions of segmented pixel areas of the map image 500 representing text and/or icons. In FIG. 6, the convolutional neural network reconstructs the map image using the text and/or icon pixel regions and presents the reconstructed map image 604 at the output of the convolution neural network 602.

Figure 7:
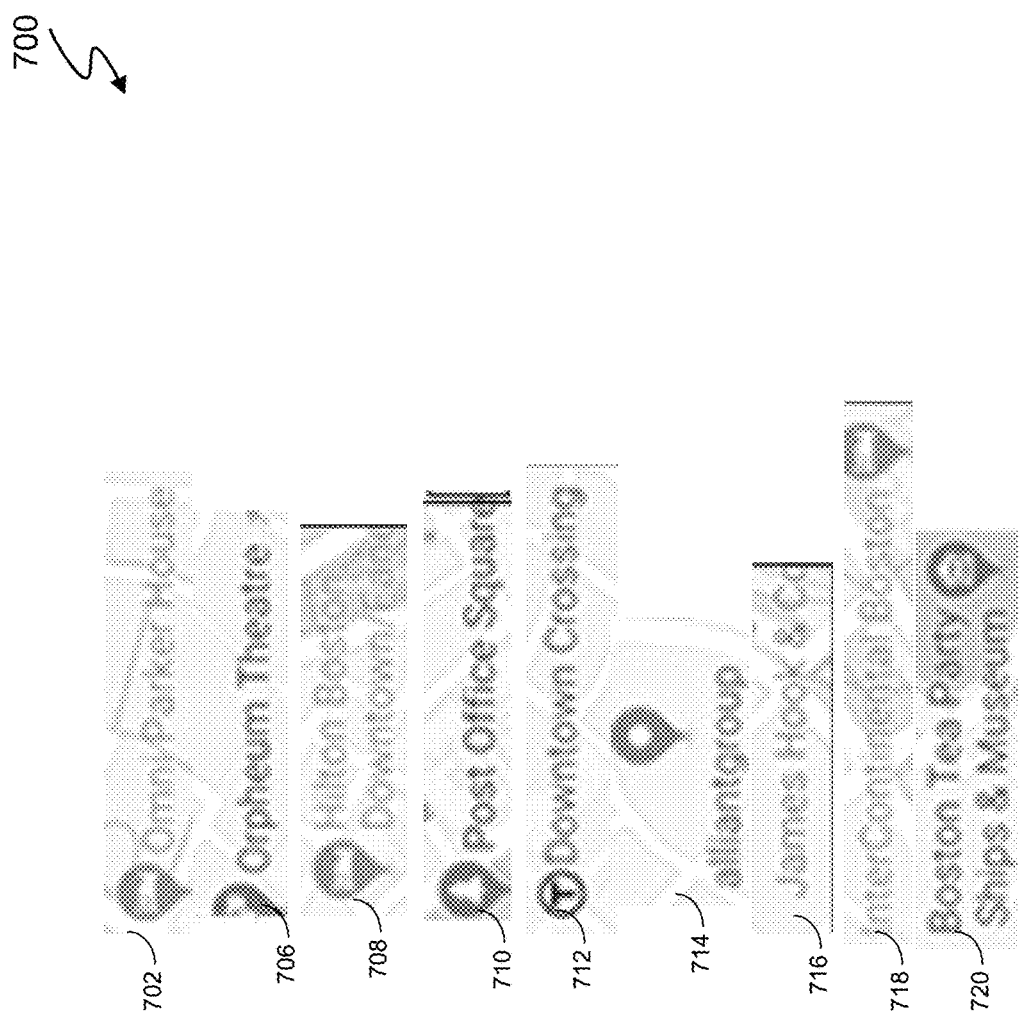
FIG. 7 shows one example of a reconstructed map image.

FIG. 7 shows one example of a reconstructed map image 700. As shown in this example, the convolutional neural network 602 has extracted regions of the map image 500 having text and/or icons and aggregated the regions in a manner that allows for subsequent entity identification operations. For example, the pixel segments of region 504 of FIG. 5 have been reconstructed by the convolutional neural network 602 as region 702 in the reconstructed map image 700. The pixel segments of region 506 of FIG. 5 have been reconstructed by the convolutional neural network 602 as region 706 in the reconstructed map image 700. FIG. 7 also shows regions 708-720 that have been reconstructed from map image 500 by the convolutional neural network 602.

Figure 8:
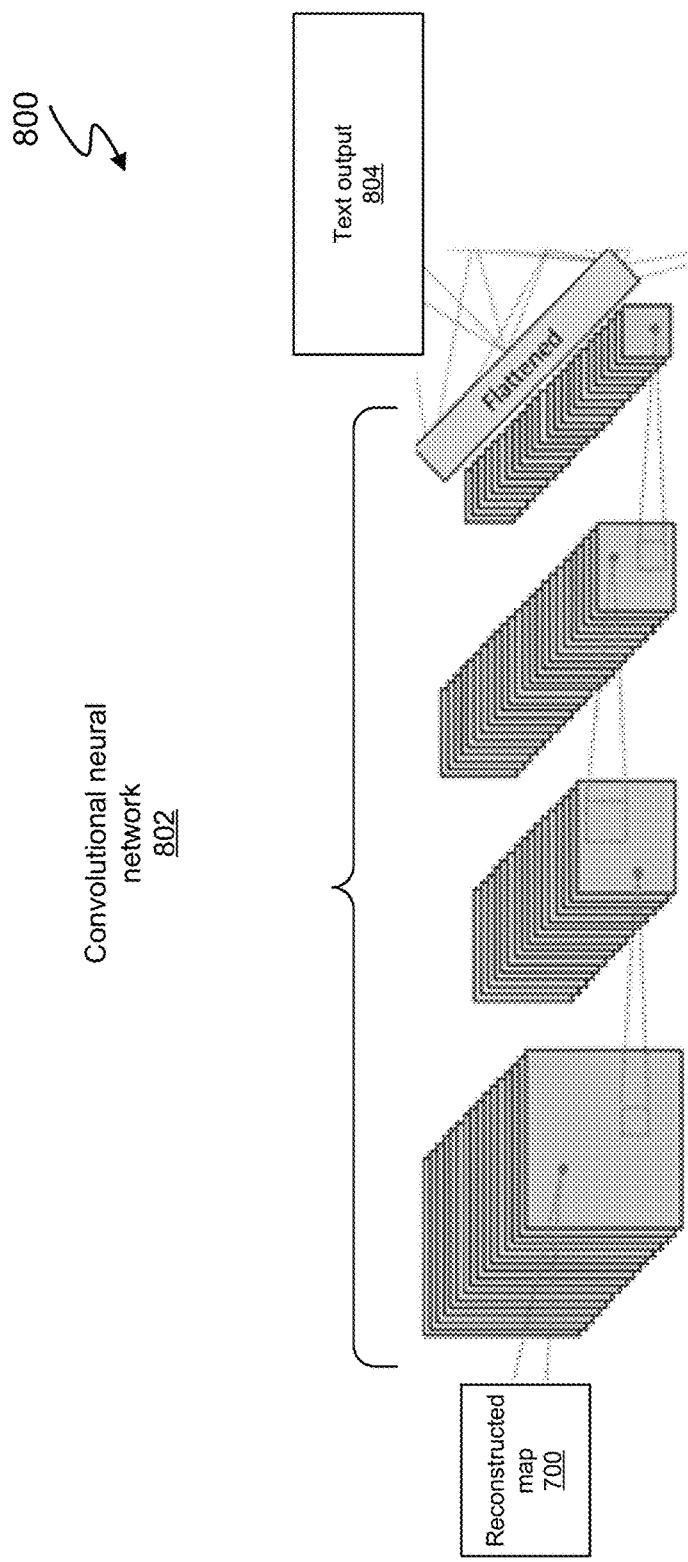
FIG. 8 shows a neural network environment that may be used in certain embodiments of the disclosed system.

FIG. 8 shows a neural network environment 800 that may be used in certain embodiments of the disclosed system. In this example, the reconstructed map image 700 is provided to the input of a convolutional neural network 802. In certain embodiments, the convolutional neural network conducts an optical character recognition (OCR) operation on the reconstructed map image 700 to identify entities present in the reconstructed map image 700. In at least one embodiment, the convolutional neural network 802 provides a text output 804 including text corresponding to the names of entities found in the reconstructed map image 700. In at least one embodiment, the text output 804 includes a textual identification of an entity type for an entity name based on an icon that is detected in a vicinity proximate the entity name in the reconstructed map image. For example, without limitation, the text output for region 702 of the reconstructed map image 700 is "Omni Parker House." However, the "Omni Parker House" entity is associated with a hotel icon in region 702. Accordingly, some embodiments may associate the text "hotel" (or other appropriate entity type classification) in the text output 804 with the entity name "Omni Parker House."

In certain embodiments, names for the entities detected in the reconstructed map image 700 are associated with a corresponding entity type (see, for example, FIG. 3). Localities may be scored based on the entity types found in the localities.

In certain embodiments, map reconstruction operations and text recognition operations may be executed using a single convolutional neural network. In such embodiments, convolutional neural network 602 and convolutional neural network 802 may be consolidated as a single convolutional neural network that extracts textual and/or icon regions of a map image for a locality, reconstructs a map image using the extracted textual and/or icon regions of the map image, and detects text associated with entities in the locality.

Figure 9:
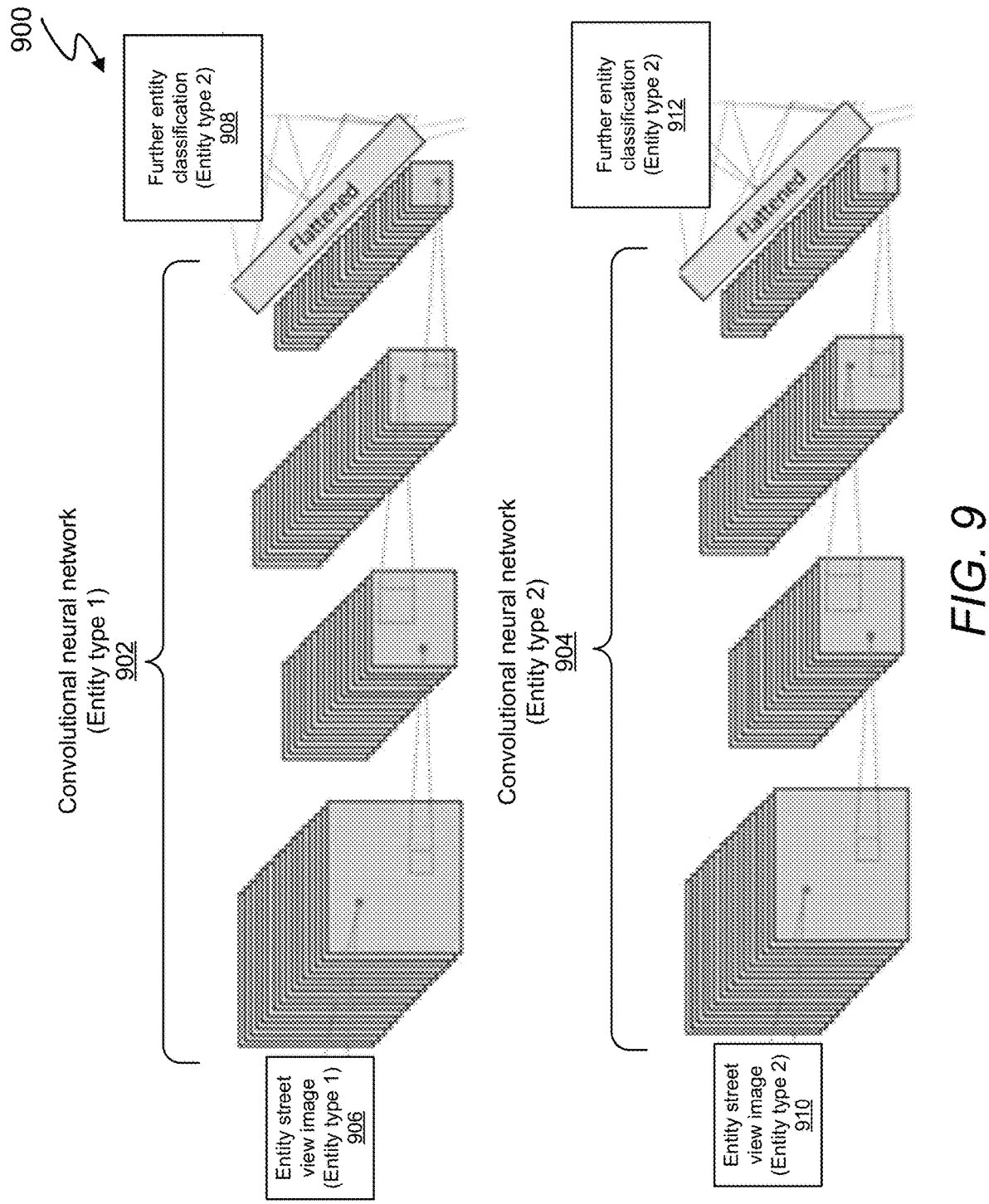
FIG. 9 shows a neural network environment that may be used in certain embodiments of the disclosed system.

FIG. 9 shows a neural network environment 900 that may be used in certain embodiments of the disclosed system. The neural network environment 900 includes convolutional neural network 902 and convolutional neural network 904 that are configured to assign further classifications to entities based on a street view images of the entities. In certain embodiments, convolutional neural network 902 has been trained to classify entities of a first type (Entity type 1, such as educational entities), while convolutional neural network 904 has been trained to classify entities of a second type (Entity type 2, such as retail entities). In at least one embodiment, street view images 906 of entities of entity type 1 are provided to the input of the convolutional neural network 902, which provides a further entity classification for type 1 entities at output 908. In at least one embodiment, street view images 910 of entities of entity type 2 are provided to the input of the convolutional neural network 904, which provides a further entity classification for the type 2 entities at output 912. Although separate convolutional neural networks are used to classify different entity types, some embodiments may employ individual convolutional neural networks that have been trained and configured to operate on images of multiple entity types.

Figure 10:
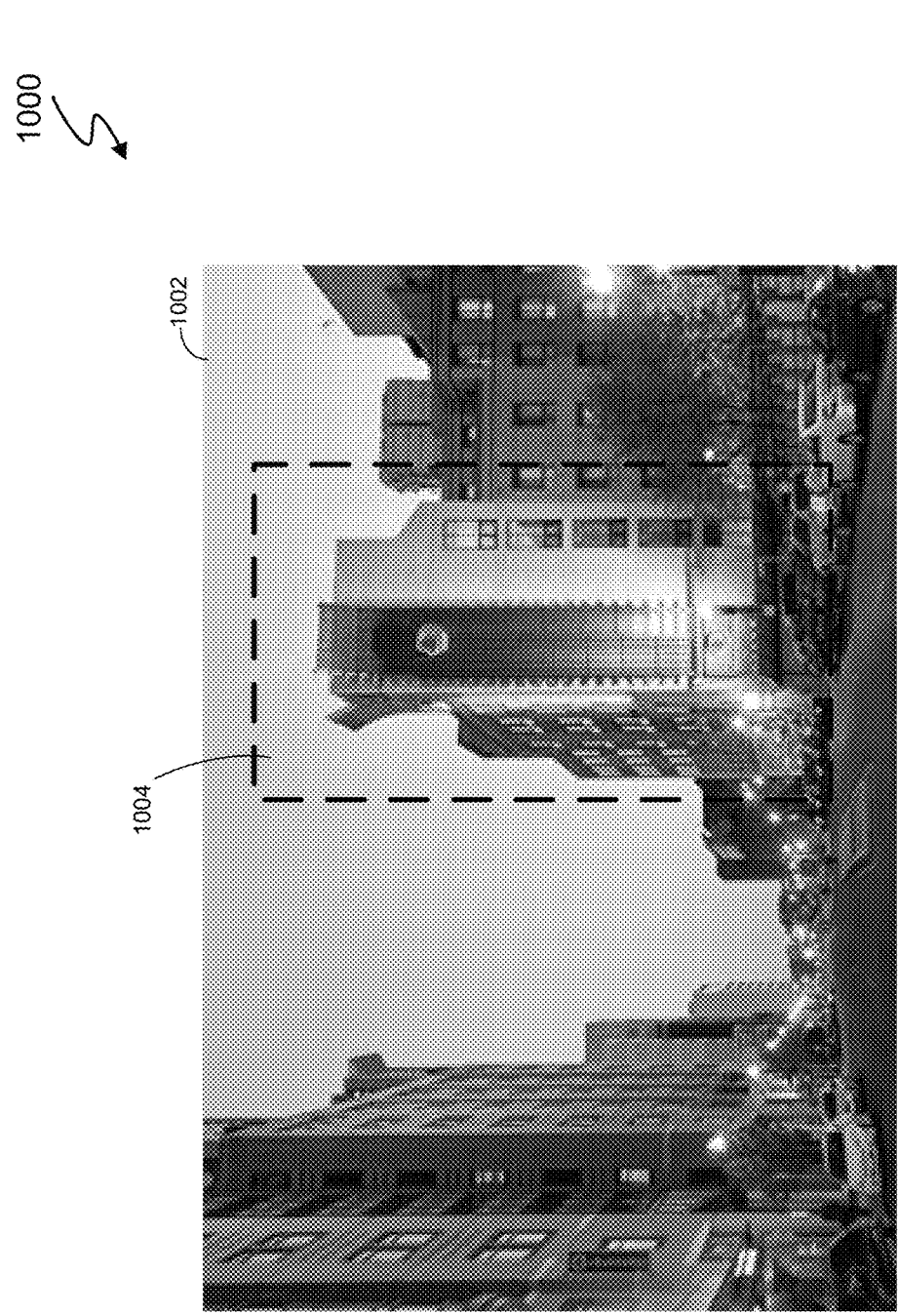
FIG. 10 is an illustration of a further classification that has been assigned to an entity based on the street view image of the entity.

FIG. 10 is an illustration 1000 of a further classification that has been assigned to an entity based on the street view image 1002 of the entity. In this example, street view image 1002 includes an image region 1004 of a hotel entity that is to be classified using a convolutional neural network that has been trained using, for example, hotel images. One example of classifications that may be assigned to the entity in image region 1004 as shown in table 1006. Here, the type of building is classified as a "Hotel," the nature of the hotel is "Luxury," and the entity is in a locality that has been generally identified as "Downtown."

Embodiments of the disclosure are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

What is claimed is:

1. A computer-implemented method for using machine vision, the method comprising:
    training a neural network to extract regions of segmented pixel areas of a map image, the neural network comprising a first convolutional neural network and a second convolutional network, the training comprising classifying entities from a plurality of entities based upon at least one of text and icons represented within the segmented pixel areas, the classifying entities comprising classifying entities into a first type and a second type, the first convolutional neural network being trained using entities of the first type and the second convolutional neural network being trained using entities of the second type;
    accessing a map image of a locality, wherein the map image of the locality includes geographical artefacts corresponding to entities within the locality;
    analyzing, using the neural network, the map image to detect entities in the locality using the geographical artefacts;
    assigning entity classes to the detected entities in the locality, the assigning the entities in the locality comprising assigning detected entities in the locality to the first type or the second type;
    assigning a locality score to the locality based on the entity classes included in the locality;
    retrieving street view images for one or more of the detected entities in the locality; and analyzing the street view images of the detected entities to assign one or more classifications to the detected entities, certain characteristics of the street view images being used to assign the one or more classifications, the one or more classifications being used in combination with the locality score of the locality to classify an entity at the locality.

2. The computer-implemented method of claim 1, wherein:
    the geographical artefacts include one or more of text and/or icons associated with the entities within the locality.

3. The computer-implemented method of claim 1, wherein analyzing the map image comprises:
    providing the map image to the neural network, wherein the neural network is configured to separate portions of the map image having geographical artefacts from portions of the map image that do not have geographical artefacts;
    reconstructing the map image using the portions of the map image having geographical artefacts; and
    identifying entities in the reconstructed map image using geographical artefacts of the reconstructed map image.

4. The computer-implemented method of claim 3, further comprising:
    accessing a database for the locality to identify the entities using textual portions of the reconstructed map image.

5. The computer-implemented method of claim 1, wherein assigning the locality score comprises:
    clustering entities having similar entity classes within the locality into cluster types; and
    assigning the locality score to the locality based on the clustered entities within the locality.

6. The computer-implemented method of claim 5, further comprising:
    assigning the locality scores to the locality using a percentage based analysis, wherein a percentage is assigned to a cluster type based on a number of the entities included in the cluster type to a total number of clustered entities.

7. The computer-implemented method of claim 1, wherein
    analyzing the map image includes
        providing the map image to the neural network, wherein the neural network is configured to separate portions of the map image having geographical artefacts from portions of the map image that do not have geographical artefacts;
        reconstructing the map image using the portions of the map image having geographical artefacts;
        detecting entities in the reconstructed map using the geographical artefacts;
        identifying entity classes of the detected entities;

wherein assigning the locality score includes
clustering entities with similar entity classes within the locality, wherein a cluster has a cluster type corresponding to the entity classes within the cluster; and
wherein analyzing the street view images includes
providing street views of the identified entities to an input of a further neural network, wherein the further neural network has been trained to classify the entities within a cluster based on the cluster type.

8. A system comprising:
a processor;
a data bus coupled to the processor;
and a non-transitory, computer-readable storage medium embodying computer program code, the non-transitory, computer-readable storage medium being coupled to the data bus, the computer program code interacting with a plurality of computer operations and comprising instructions executable by the processor and configured for:
training a neural network to extract regions of segmented pixel areas of a map image, the neural network comprising a first convolutional neural network and a second convolutional network, the training comprising classifying entities from a plurality of entities based upon at least one of text and icons represented within the segmented pixel areas, the classifying entities comprising classifying entities into a first type and a second type, the first convolutional neural network being trained using entities of the first type and the second convolutional neural network being trained using entities of the second type;
accessing a map image of a locality, wherein the map image of the locality includes geographical artefacts corresponding to entities within the locality;
analyzing, using the neural network, the map image to detect entities in the locality using the geographical artefacts;
assigning entity classes to the detected entities in the locality, the assigning the entities in the locality comprising assigning detected entities in the locality to the first type or the second type;
assigning a locality score to the locality based on the entity classes included in the locality;
retrieving street view images for one or more of the detected entities in the locality; and
analyzing the street view images of the detected entities to assign one or more classifications to the detected entities, certain characteristics of the street view images being used to assign the one or more classifications, the one or more classifications being used in combination with the locality score of the locality to classify an entity at the locality.

9. The system of claim 8, wherein:
the geographical artefacts include one or more of text and/or icons associated with the entities within the locality.

10. The system of claim 8, wherein analyzing the map image comprises:
providing the map image to the neural network, wherein the neural network is configured to separate portions of the map image having geographical artefacts from portions of the map image that do not have geographical artefacts;
reconstructing the map image using the portions of the map image having geographical artefacts; and
identifying entities in the reconstructed map image using geographical artefacts of the reconstructed map image.

11. The system of claim 10, further comprising:
accessing a database for the locality to identify the entities using textual portions of the reconstructed map image.

12. The system of claim 8, wherein assigning the locality score comprises:
clustering entities having similar entity classes within the locality into cluster types; and
assigning the locality score to the locality based on the clustered entities within the locality.

13. The system of claim 12, further comprising:
assigning the locality scores to the locality using a percentage based analysis, wherein a percentage is assigned to a cluster based on a number of the entities included in the cluster to a total number of clustered entities.

14. The system of claim 8, wherein:
analyzing the map image includes
providing the map image to the neural network, wherein the neural network is configured to separate portions of the map image having geographical artefacts from portions of the map image that do not have geographical artefacts;
reconstructing the map image using the portions of the map image having geographical artefacts;
detecting entities in the reconstructed map using the geographical artefacts;
identifying entity classes of the detected entities;
wherein assigning the locality score includes
clustering entities with similar entity classes within the locality, wherein a cluster has a cluster type corresponding to the entity classes within the cluster; and
wherein analyzing the street view images includes
providing street views of the identified entities to an input of a further neural network, wherein the further neural network has been trained to classify entities within a cluster based on the cluster type.

15. A non-transitory, computer-readable storage medium embodying computer program code, the computer program code comprising computer executable instructions configured for:
training a neural network to extract regions of segmented pixel areas of a map image, the neural network comprising a first convolutional neural network and a second convolutional network, the training comprising classifying entities from a plurality of entities based upon at least one of text and icons represented within the segmented pixel areas, the classifying entities comprising classifying entities into a first type and a second type, the first convolutional neural network being trained using entities of the first type and the second convolutional neural network being trained using entities of the second type;
accessing a map image of a locality, wherein the map image of the locality includes geographical artefacts corresponding to entities within the locality;
analyzing, using the neural network, the map image to detect entities in the locality using the geographical artefacts;
assigning entity classes to the detected entities in the locality, the assigning the entities in the locality comprising assigning detected entities in the locality to the first type or the second type;
assigning a locality score to the locality based on the entity classes included in the locality;

retrieving street view images for one or more of the detected entities in the locality; and analyzing the street view images of the detected entities to assign one or more classifications to the detected entities, certain characteristics of the street view images being used to assign the one or more classifications, the one or more classifications being used in combination with the locality score of the locality to classify an entity at the locality.

16. The non-transitory, computer-readable storage medium of claim 15, wherein:

the geographical artefacts include one or more of text and/or icons associated with the entities within the locality.

17. The non-transitory, computer-readable storage medium of claim 15, wherein analyzing the map image comprises:

providing the map image to the neural network, wherein the neural network is configured to separate portions of the map image having geographical artefacts from portions of the map image that do not have geographical artefacts;

reconstructing the map image using the portions of the map image having geographical artefacts; and identifying entities in the reconstructed map image using geographical artefacts of the reconstructed map image.

18. The non-transitory, computer-readable storage medium of claim 17, further comprising:

accessing a database for the locality to identify the entities using textual portions of the reconstructed map image.

19. The non-transitory, computer-readable storage medium of claim 15, wherein assigning the locality score comprises:

clustering entities having similar entity classes within the locality into cluster types; and assigning the locality score to the locality based on the clustered entities within the locality.

20. The non-transitory, computer-readable storage medium of claim 19, further comprising:

assigning the locality scores to the locality using a percentage based analysis, wherein a percentage is assigned to a cluster based on a number of the entities included in the cluster in relation to a total number of clustered entities.

* * * * *